(12) United States Patent
Ohta

(10) Patent No.: US 7,339,706 B2
(45) Date of Patent: Mar. 4, 2008

(54) ERROR DIFFUSION PROCESSING CIRCUIT FOR AN IMAGE SIGNAL WHICH IMPROVES AN OUTPUT IMAGE

(75) Inventor: Mutsumi Ohta, Tokyo (JP)

(73) Assignee: Pioneer Corporation, Tokyo (JP)

(*) Notice: Subject to any disclaimer, the term of this patent is extended or adjusted under 35 U.S.C. 154(b) by 868 days.

(21) Appl. No.: 10/437,893

(22) Filed: May 15, 2003

(65) Prior Publication Data

US 2003/0218778 A1    Nov. 27, 2003

(30) Foreign Application Priority Data

May 21, 2002    (JP)    ............................. 2002-146705

(51) Int. Cl.
*H04N 1/405*    (2006.01)
(52) U.S. Cl. .................. 358/3.03; 358/3.05; 382/252
(58) Field of Classification Search .............. 358/1.9, 358/2.1, 3.03–3.05, 463; 382/252
See application file for complete search history.

(56) References Cited

U.S. PATENT DOCUMENTS

| 5,880,857 | A | * | 3/1999 | Shiau et al. ............... 358/3.03 |
| 6,134,351 | A | * | 10/2000 | Waki et al. ................ 382/252 |
| 6,606,168 | B1 | * | 8/2003 | Rylander .................... 358/3.09 |
| 2001/0015816 | A1 | * | 8/2001 | Metcalfe ..................... 358/1.9 |

FOREIGN PATENT DOCUMENTS

| JP | 63-172381 A | 7/1988 |
| JP | 07-288689 A | 10/1995 |
| JP | 9-24751 A | 9/1997 |
| JP | 10-155087 A | 6/1998 |
| JP | 10-261080 A | 9/1998 |
| JP | 2000-287086 A | 10/2000 |
| JP | 2000-299787 A | 10/2000 |
| JP | 2001-119579 A | 4/2001 |
| JP | 2001-218052 A | 8/2001 |
| JP | 2001-257880 A | 9/2001 |

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

An error diffusion processing circuit includes an error diffusion processing unit and a noise signal unit. The error diffusion processing unit generates a first output image signal of a first pixel by carrying out an error diffusion process, based on an inputted first input image signal of the first pixel. The number of gray tones of the first output image signal is smaller than that of the input image signal. The noise signal unit which generates a noise signal and outputs the noise signal to the error diffusion processing unit. The noise signal is inputted into a feedback loop of the error diffusion process.

20 Claims, 10 Drawing Sheets

ERROR DIFFUSION PROCESSING CIRCUIT FOR AN IMAGE SIGNAL WHICH IMPROVES AN OUTPUT IMAGE

BACKGROUND OF THE INVENTION

1. Field of the Invention

The present invention relates to an error diffusion processing circuit for an image signal. More particularly, the present invention relates to an error diffusion processing circuit for an image signal which improves an output image.

2. Description of the Related Art

For a digitized display, such as a PDP (Plasma Display Panel), gray scale is represented with quantized value, and there is a limit on the number of gray tones. Thus, an image processing method, such as an error diffusing process for an input image, is generally used for apparently increasing the number of the gray tones.

This error diffusion processing method can increase the number of apparent gray tones by diffusing the quantized error into peripheral pixels. The quantized error is defined as a difference between input value and quantized one.

The above-mentioned error diffusion processing method is carried out by an error diffusion processing circuit for the image signal. The error diffusion processing circuit is constituted by a feedback loop circuit. When the image signal such as a high vision signal is targeted, this circuit must be operated at a very high speed. For this reason, a bit precision in the feed back loop needs to be reduced to some degree in some cases. The wider the bit width of the signal, the tighter a calculation speed of an adder and a multiplier in a filter unit of the error diffusion.

FIG. 1 shows a block diagram of an error diffusion processing circuit in a prior art. Here, let us consider an error diffusing system which limits an N-bit input signal to M (<N) bits and outputs M-bit output signal. The main part of the circuit is a quantizing unit 112, where an N-bit input signal is quantized to an M-bit input signal. As this quantizing method, there may be various methods such as a rounding down operation, a rounding up operation, a rounding off operation, an adaptive threshold and the like. Any of them may be used. The quantized result is outputted as the output signal. At the same time, a quantized error signal is also calculated by a subtracter 113. This quantized error signal is spatially diffused in a filter unit 115 and added to the input signal by using an adder 110. If a gain of the filter in the filter unit 115 is 1, it implies that the quantized error induced in a certain pixel is diffused into the peripheral pixels This is the basic configuration of the error diffusing method. Here, by adding the quantized error signal to the input signal, there is a possibility of the overflow/underflow from a dynamic range. Thus, in many cases, a limiter 111 is placed in an actual circuit.

FIGS. 2A and 2B show an example when a signal bit width of an error diffusion feedback loop is limited in the circuit in FIG. 1. In FIG. 2A, the gray tone values of all pixels are set to 3/1024. FIG. 2B shows a one-bit output image generated by using an error diffusion filter of a Floyd-Steinberg type. In this output image, the pixels having gray tone values of 0/256 and 1/256 are properly mixed to thereby attain the average gray tone representation of 3/1024.

However, if the signal bit width of the feedback loop in the above-mentioned error diffusing circuit is limited to the 10 bits, a particular pattern may appear in the output image, as shown in FIG. 2B, where the pixel of 0/255 is represented by black, and the pixel of 1/255 is represented by white for easy understanding. The technique is desired to avoid the particular pattern (as shown in FIG. 2B) appearing in a certain kind of an image, as mentioned above.

Also, when many gray tone representations are tried under the limited number of gray tones, a random dither method, a dither pattern method, an error diffusing method and the like are well known methods. Many methods obtained by combining above-mentioned methods are invented.

For example, Image Processing Apparatus is disclosed in Japanese Laid Open Patent Application (JP-A 2000-287086).

The image processing apparatus processes an input image information from a predetermined image input unit and then outputs it. The image processing apparatus includes a many-valued error diffusing processor, a random noise generator and a noise superimposing processor. The many-valued error diffusing processor has a quantizing processor, a quantized error detector, a peripheral error calculator and an error-superimposing unit. The quantizing processor quantizes sequentially inputted pixel data constituting the image information in accordance with output values distributed at a predetermined gray tone difference. The quantized error detector detects a quantized error of the pixel data. The peripheral error calculator integrates the quantized error of the pixel data detected by the quantized error detector with a quantized error of its peripheral pixel data. The error-superimposing unit for feedback adding an integration error calculated by the peripheral error calculator to a next input pixel data. The random noise generator generates a random noise, on the basis of a gray tone level of an input pixel data. The noise superimposing processor superimposes, on the pixel data, the random noise generated by the random noise generator before the many-valued error diffusing processor performs the many-valued error diffusing process on the pixel data.

This provides an image processing apparatus that can suppress a pseudo gray tone phenomenon through a many-valued error diffusing process.

In the image processing apparatus, an operation for adding random noise is added to an error diffusing process in order to increase an operational precision of an error diffusion loop circuit. However, the operation for adding the noise is not added to the error diffusion loop, and it is added before the loop process. Thus, a natural error diffusion pattern can not be obtained.

Also, in Image Processing Method is disclosed in Japanese Laid Open Patent Application (JP-A-Heisei, 9-247451).

The image processing method carries out a two-valued process for converting a many-valued image into a two-valued image through an error diffusion and an encoding process for encoding the two-valued image obtained by the two-valued process. It provides a relative relation between a range of the error diffusion in the two-valued process and a process data unit treated by the encoding process.

The image processing method aims to provide an image processing method that can improve a compressing efficiency, when an encoding process compresses a pseudo halftone image obtained by an error diffusing method, from a many-valued image.

In the image processing method, a random number generator is added to an error diffusing circuit. However, even in this method, the operation for adding the noise is not added to an error diffusion loop.

Also, Pseudo Gradating Circuit And Pseudo Gradating Method is disclosed in Japanese Laid Open Patent Application (JP-A 2001-218052).

The pseudo-gradating circuit includes a memory, an adder, an adder and a controller The memory stores a predetermined data series. The adder adds the predetermined data series to an image data. The adder adds an inputted input image data and an error data in a pseudo-gradated image data. The controller carries out a control to add 0 without adding the data series and the error data in accordance with a predetermined control signal. Here, a dithering process and an error diffusing process are executed by one circuit.

The pseudo-gradating circuit aims to make a size of a circuit smaller and make a cost lower while enabling a dithering process and an error diffusing process to be carried out by one substrate. . It also aim to protect a dot in a white background from being generated even if a discontinuity of a gray tone is corrected by the error diffusing process. It also aim to protect a color deviation in a colored character and a uniform image region from being generated even if an error data is added by the error diffusing process.

In the pseudo-gradating circuit, a noise signal is added to an error diffusing circuit so that an error diffusing method and a dithering method are switched by one circuit. However, this does not improve the error diffusing method.

Moreover, Image Processing Apparatus is disclosed in Japanese Laid Open Patent Application (JP-A 2001-119579).

The image processing apparatus performs an N-valued (M>N) process on an M-valued image data of a remarkable pixel in accordance with an error diffusing method The image processing apparatus includes a correcting unit, a calculating unit and an output unit. The correcting unit corrects the M-valued image data of the remarkable pixel on the basis of an N-valued error of its peripheral pixel and uses it as a correction image data. The calculating unit compares the correction image data with a threshold and calculates an N-valued image data of the remarkable pixel. The output unit outputs an N-valued error having the number of bits less than that of the correction image data by using a many-valued dithering method, in accordance with the correction image data and the N-valued image data.

The image processing apparatus provides an image processing apparatus using an error diffusing method that can carry out a high-speed process.

In the image processing apparatus, a dither operation is performed on a signal before a quantizing operation, among two signals to obtain a quantized error signal. However, the signal itself before the quantizing operation is only dithered. A signal such as a dither pattern is not added as noise.

Also, in Image Processing Method, Apparatus for the Same, And Recording Medium is disclosed in Japanese Laid Open Patent Application (JP-A 2001-257880).

The image processing method is for performing a halftone process on an input image by using an error diffusing method. The image processing method includes four steps. The first step is for generating a sine wave on which amplitude and frequency modulations are performed, in accordance with an average value between a remarkable pixel value and a peripheral pixel value. The second step is for adding the diffused quantized error, the remarkable pixel value and the sine wave. The third step is for quantizing the addition result on the basis of a predetermined number of gray tones. The fourth step is for calculating the quantized error of the peripheral pixel from the error caused by the quantizing operation.

The image processing method improves a geometrical texture of an output image and a particle property, in a halftone process that uses an error diffusing method.

In the image processing method, the circuit is designed such that a sine wave is added to an adder 10. However, in this technique, its circuit configuration is complex since a sine wave on which amplitude and frequency modulations are performed in accordance with an average value between remarkable pixel and peripheral pixel values is added.

SUMMARY OF THE INVENTION

Therefore, an object of the present invention is to provide an error diffusing circuit, which improves an output image.

Another object of the present invention is to provide an error diffusing circuit, which avoids appearing a particular pattern from a certain kind of an image.

Still another object of the present invention is to provide an error diffusing circuit, which achieves above objects by a circuit configured simply.

In order to achieve an aspect of the present invention, the present invention provides an error diffusion processing circuit including: an error diffusion processing unit and a noise signal unit. The error diffusion processing unit generates a first output image signal of a first pixel by carrying out an error diffusion process, based on an inputted first input image signal of the first pixel. The number of gray tones of the first output image signal is smaller than that of the input image signal. The noise signal unit which generates a noise signal and outputs the noise signal to the error diffusion processing unit. The noise signal is inputted into a feedback loop of the error diffusion process.

In the error diffusion processing circuit of the present invention, the error diffusion processing unit includes a quantizing unit, a subtracter, a filtering unit, a first adder and a second adder. The quantizing unit quantizes the first input image signal and generates the first output image signal. The subtracter generates a first quantized error signal based on a difference between the first input image signal and the first output image signal. The filtering unit generates a plurality of error signals of predetermined pixels based on the quantized error signal, and outputs a second error signal of a second pixel next to the first pixel. The second error signal is included in the plurality of error signals. The first adder adds the second error signal to a second input image signal of the second pixel before inputted to the quantizing unit. The second adder adds the noise signal to any one of the first input image signal before the subtracter, the first output image signal before the subtracter, the first quantized error signal, the second error signal and the second input image signal to which the second error signal is added.

In the error diffusion processing circuit of the present invention, the noise signals are random and an average of the noise signals is constant in a certain range of an image.

In the error diffusion processing circuit of the present invention, the second adder is provided between the quantizing unit and the subtracter.

In the error diffusion processing circuit of the present invention, the second adder is provided between the subtracter and the filtering unit.

In the error diffusion processing circuit of the present invention, the second adder is provided between the filtering unit and the first adder.

In the error diffusion processing circuit of the present invention, the second adder is provided between the first adder and the quantizing unit.

In the error diffusion processing circuit of the present invention, the second adder is provided between the first adder and the subtracter.

In the error diffusion processing circuit of the present invention, the certain range is less than a half of a line in a frame.

In the error diffusion processing circuit of the present invention, the noise signal is generated based on M-sequence (Maximal linear recurrence sequence).

In the error diffusion processing circuit of the present invention, the noise signal is generated based on a dither pattern composed of 1 and 0.

In the error diffusion processing circuit of the present invention, the noise signal is a alternate signal composed of 1 and 0.

The error diffusion processing circuit of the present invention further includes a limiter. The limiter is inserted into an input side of the quantizing unit and limits a level of the second input image signal to which the second error signal and the noise signal are added.

In the error diffusion processing circuit of the present invention, the noise signal unit includes: a pixel position counter a line number counter and an exclusive-OR. The pixel position counter outputs a pixel position. The line number counter outputs a line number. The exclusive-OR circuit outputs the exclusive-OR operation between the pixel position and the line number.

In order to achieve another aspect of the present invention, the present invention provides an error diffusion processing method including the steps of: (a) quantizing a first input image signal of a first pixel and generating a first output image signal of the first pixel; (b) generating a first quantized error signal based on a difference between the first input image signal and the first output image signal; (c) generating a plurality of error signals of predetermined pixels based on the quantized error signal; (d) adding a second error signal of a second pixel to a second input image signal of the second pixel, wherein the second pixel is next to the first pixel, the second error signal is included in the plurality of error signals; and (e) adding the noise signal to any one of the first input image signal, the first output image signal, the first quantized error signal, the second error signal and the second input image signal to which the second error signal is added. The second input image signal is processed in the step (a), after the step (d) and the step (e) are carried out.

In the error diffusion processing method of the present invention, the noise signals are random and an average of the noise signals is constant in a certain range of an image.

In the error diffusion processing method of the present invention, the certain range is less than a half of a line in a frame.

In the error diffusion processing method of the present invention, the noise signal is generated based on M-sequence (Maximal linear recurrence sequence).

In the error diffusion processing method of the present invention, the noise signal is generated based on a dither pattern composed of 1 and 0.

In the error diffusion processing method of the present invention, the noise signal is a alternate signal composed of 1 and 0.

The error diffusion processing method of the present invention further includes the step of: (f) limitting a level of the second input image signal to which the second error signal and the noise signal are added.

DESCRIPTION OF THE PREFERRED EMBODIMENTS

Figure 3:
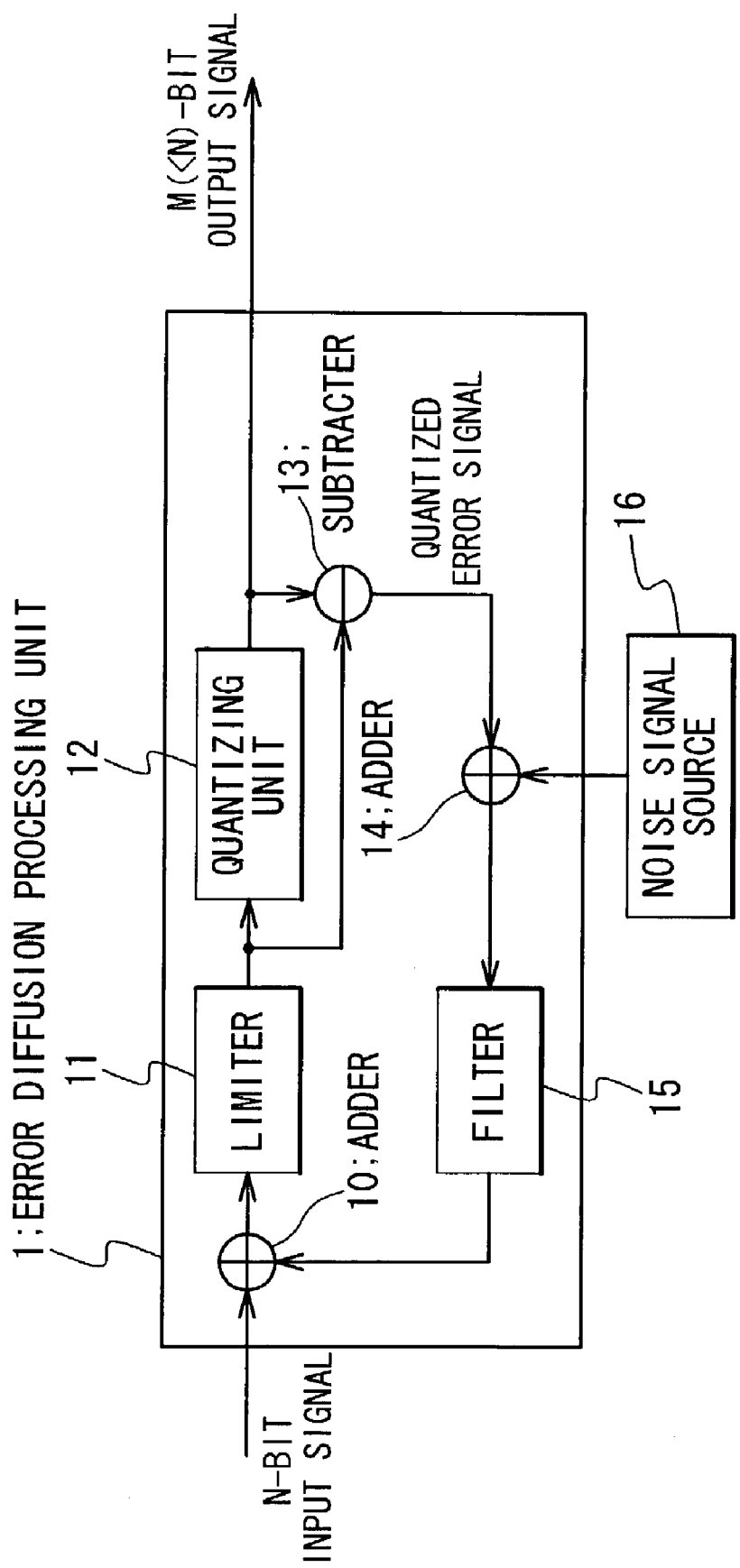
FIG. 3 is a block diagram of an error diffusion processing circuit of a first embodiment of the present invention.

An embodiment of an error diffusion processing circuit of the present invention will be described below in detail with reference to the attached drawings. FIG. 3 shows a block diagram of a circuit in an embodiment of the present invention. Here, let us consider an error diffusion processing circuit (error diffusing system) which limits an N-bit motion picture input signal to M (<N) bits and outputs M-bit motion picture output signal.

The error diffusion processing circuit includes an error diffusion processing unit 1 and a noise signal source (a noise signal unit) 16.

The error diffusion processing unit 1 generates M(<N)-bit output (image) signal of a pixel by carrying out an error diffusion process based on an inputted N-bit input (image) signal. The N and the M are integers. Here, it generates (M-bit) first output signal by carrying out the error diffusion process based on an inputted N-bit first input signal.

The noise signal source (noise signal unit) 16 generates a noise signal and outputs it to the error diffusion processing unit 1. The noise signal is inputted into a feedback loop of the error diffusion process.

The error diffusion processing unit 1 includes a quantizing unit 12, a subtracter 13, a filter unit 15, an adder 10, a limiter 11, a noise signal source 16 and an adder 14.

The quantizing unit 12, which is main part of the circuit, quantizes the N-bit input signal (first input signal) to generate the M-bit output signal (first output signal). As the quantizing method, there may be the various methods such as the rounding down operation, the rounding up operation, the rounding off operation, the adaptive threshold and the like. Any of them may be used. The quantized result is outputted as the first output signal.

The subtracter 13 generates (calculates) a quantized error signal (first quantized error signal) based on the first input signal and the first output signal, such as by subtracting the first output signal from the first input signal.

The adder 14 adds the noise signal from the noise signal source 16 to the first quantized error signal.

The filtering unit 15 generates a plurality of error signals for predetermined peripheral pixels, based on the first quantized error signal to which the noise signal is added. That is, the first quantized error signal is spatially diffused into the peripheral pixels of the first pixel to generate the plurality of error signals. The filtering unit 15 outputs a second error signal for a second pixel. Here, the second pixel is the pixel next to the first pixel, and the second error signal is included in the plurality of error signals. The predetermined pixels are determined based on the error diffusion method such as Floyd & Steinberg type and Jarvis, Judice & Ninke type. The filter unit 15 is exemplified in the FIR (finite impulse response) filter.

The adder 10 adds the second error signal to a next (second) input signal for the second pixel before inputted to the quantizing unit 12.

The limiter 11 is at an input side of the quantizing unit 12 and limits a level of the second input signal to which the second error signal and the noise signal are added. The limiter 11 can avoid the possibility of the overflow/underflow of the input signal from a dynamic range.

Figure 1:
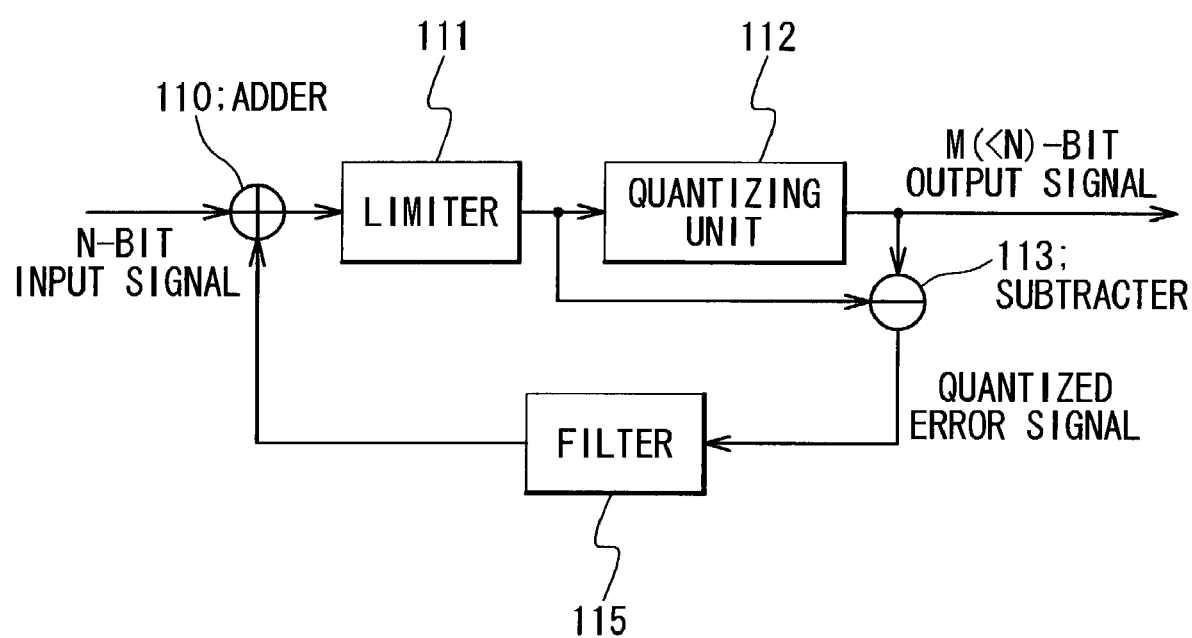
FIG. 1 is a block diagram of an error diffusion processing circuit in a prior art.

The basic configuration of the error diffusing method is the above-described error diffusion processing circuit without the adder 14 and the noise signal source 16. The quantizing unit 12, the subtracter 13, the filter unit 15 and the adder 10 form a feedback loop of the error diffusion processing circuit. The configuration is equal to that of the prior art shown in FIG. 1. Here, if a gain of the filter in the filter unit 15 is 1, it implies that the quantized error induced in a certain (first) pixel is diffused into the peripheral pixels.

However, in this embodiment, the noise signal source 16 and the adder 14 are further added as mentiond above. As the noise signal source 16, there may be any one of a random number generator, an M-sequence (Maximal linear recurrence sequence) generator, a inputting unit, and a dither pattern unit. Here, the M-sequence generator generated pseudo-random numbers of M-sequence. The inputting unit inputs 1 and 0 alternately to a K-th bit from the bottom of the signal. The dither pattern unit inputs 1 and 0 based on a dither pattern.

As for the noise signal source 16, most of random number generators can be used without any influence to the image quality, if they have the property that an average of the noise signals is constant in a certain range (local average) of an image which is associated with the input signals. For example, the random number generated by a residue method and the signal generated by the M-sequence generator has such property. The dither pattern generator for alternately generating 1 and 0 also has the property. Thus, they can attain the effect of the present invention without any influence on the image quality.

Here, the certain range (local range) is less than a half of one line in one frame of the image signals. The certain range is more preferably less than a 1/p of one line. The p is integer and more than 3. Upper limit of the p is determined based on the width of one line and the display method by the simulation or the experiment.

Figure 9:
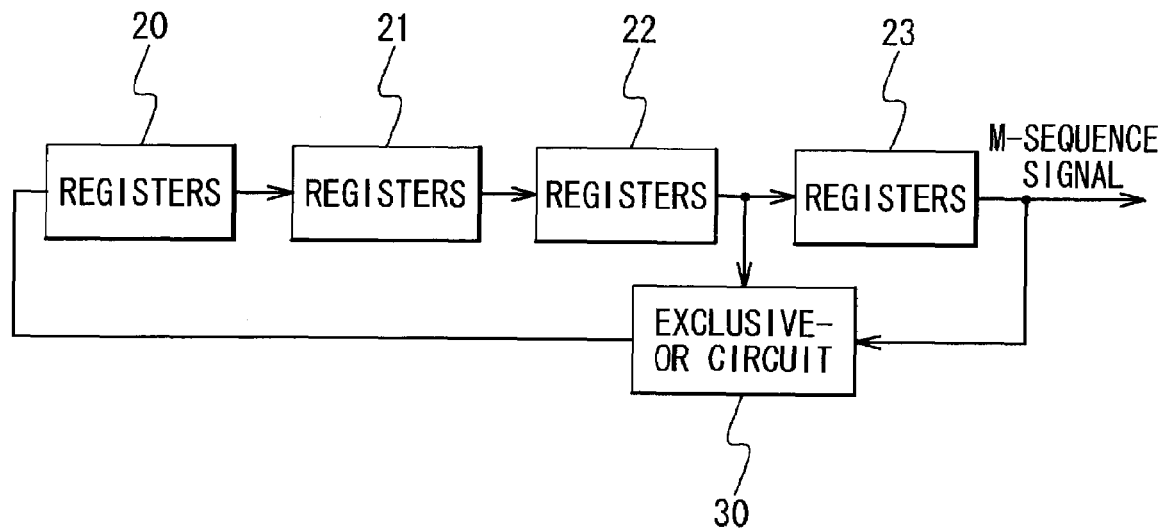
FIG. 9 is a block diagram showing an M-sequence generator in this embodiment.

An example of a circuit for generating the M-sequence is shown in a block diagram in FIG. 9. This circuit outputs the M-sequence signal when an exclusive-OR circuit 30 carries out the exclusive-OR operation between the outputs from registers 20 to 23 connected in series.

Figure 10:
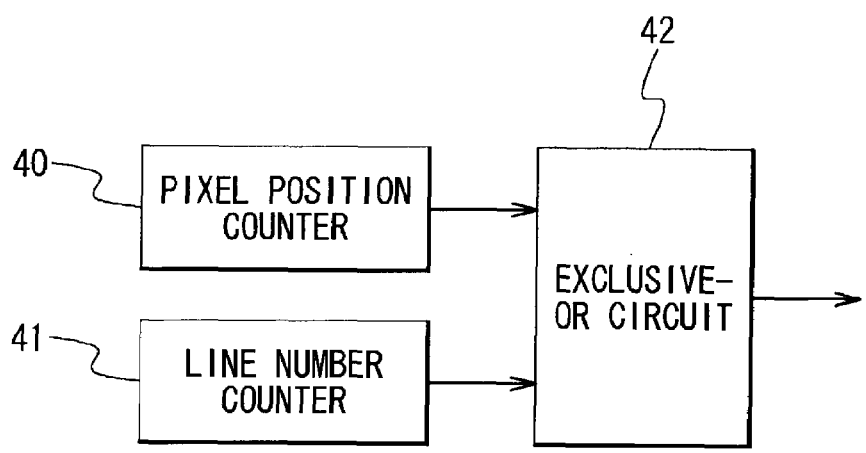
FIG. 10 is a block diagram showing a dither pattern generator in this embodiment.

Also, FIG. 10 is a block diagram showing an example of a circuit for generating the dither pattern. That is, the dither pattern is generated when an exclusive-OR circuit 42 carries out the exclusive-OR operation between an output of a pixel position counter 40 for detecting a pixel position and an output of a line number counter 41 for detecting a line number.

Figure 11:
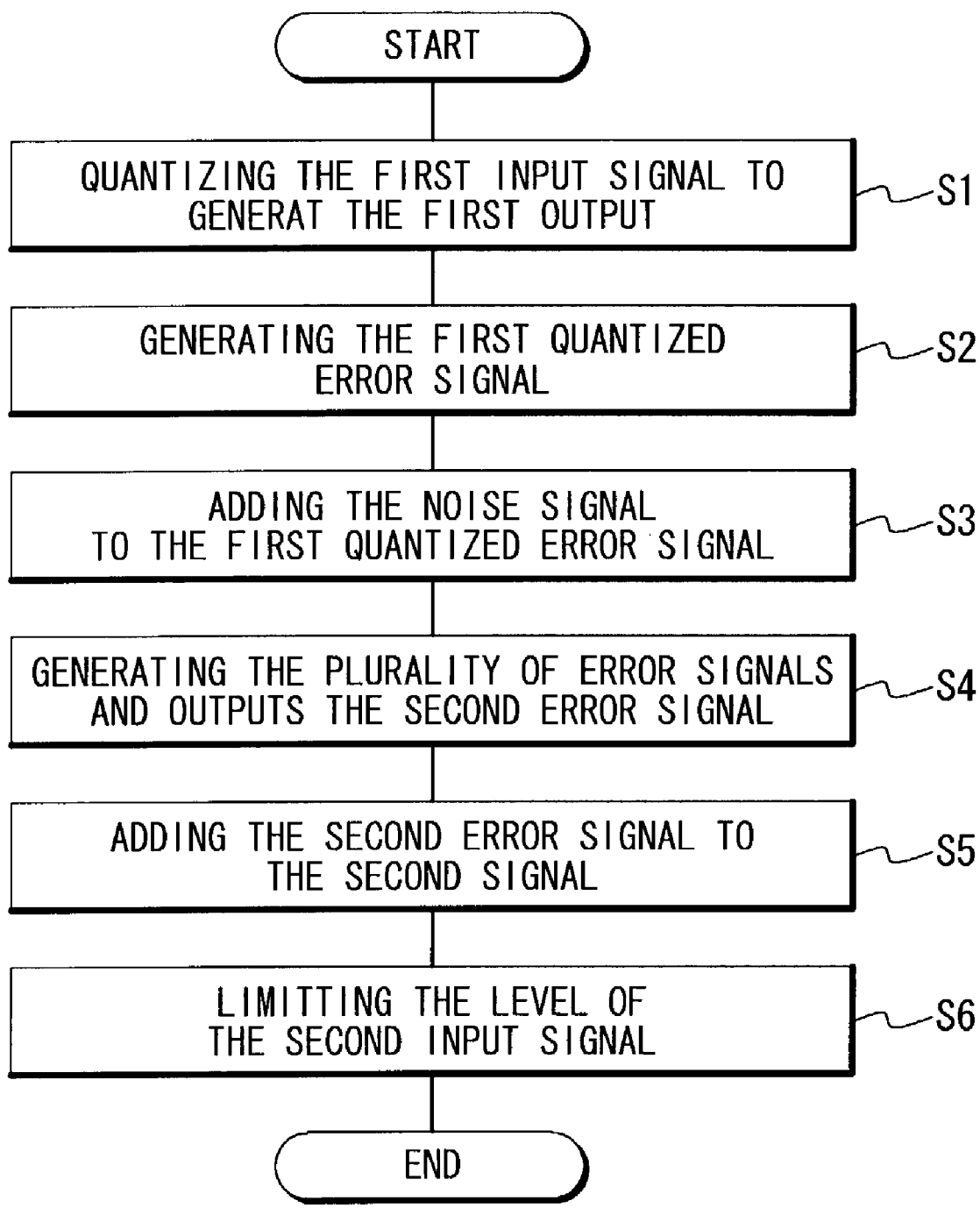
FIG. 11 is a flow chart showing an error diffusion processing method in this embodiment.

The operation of the error diffusion processing method in this embodiment will be described below, with reference to FIG. 11. FIG. 11 is a flow chart showing the error diffusion processing method in this embodiment. This circuit continues to add the noises to the feedback loop in the error diffusion process to thereby protect a diffusion pattern from getting into a particular pattern.

(1) Step 1

The quantizing unit 12 quantizes the first input signal of the first pixel and generates the first output signal of the first pixel.

(2) Step 2

The subtracter 13 generates the first quantized error signal by subtracting the first output signal from the first input signal.

(3) Step 3

The adder 14 adds the noise signal to the first quantized error signal. The noise signal is generated by the noise signal source 16.

(4) Step 4

The filtering unit 15 generating the plurality of error signals of predetermined pixels based on the quantized error signal. Then, the filtering unit 15 outputs the second error signal of the second pixel to the adder 10.

(5) Step 5

The adder 10 adds the second error signal to the second signal of the second pixel. The second signal is inputted from other circuits or apparatus. The second pixel is next to the first pixel. The second error signal is included in the plurality of error signals.

(6) Step 6

The limiter 11 limits the level of the second input signal to avoid the overflow/underflow of the second input signal from a dynamic range.

The second input signal is processed in the step (1) after the step (6). All image signal inputted to the error diffusion processing circuit is processed through the step (1) to (6).

Figure 4A:
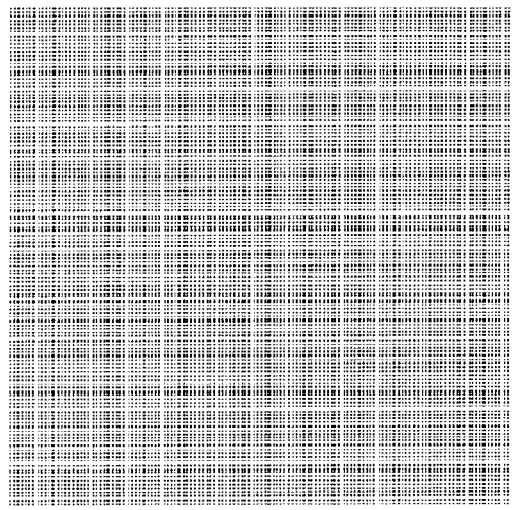
FIG. 4A is a view showing a partial raw image.
Figure 4B:
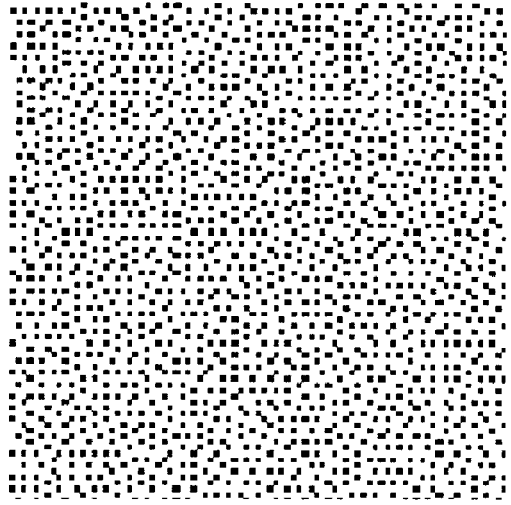
FIG. 4B is a view showing a partial image which is obtained by using the present invention to the partial raw image in FIG. 4A.

FIGS. 4A and 4B are image views showing an example when the signal bit width of the error diffusion feedback loop is limited. FIG. 4A shows the input image corresponding to the input signals. These input signals have 10 bits, and the gray tone values of all pixels are set to 3/1024. Here, for the easy understanding, the gray tone values are adjusted corresponding to FIG. 4B. In this case, FIG. 4B shows a one-bit output image generated by using an error diffusion filter of a Floyd-Steinberg type in the filter unit 15. In this output image, the pixels having the gray tone values of 0/256 and 1/256 are properly mixed to thereby attain the average gray tone representation of 3/1024.

Figure 2A:
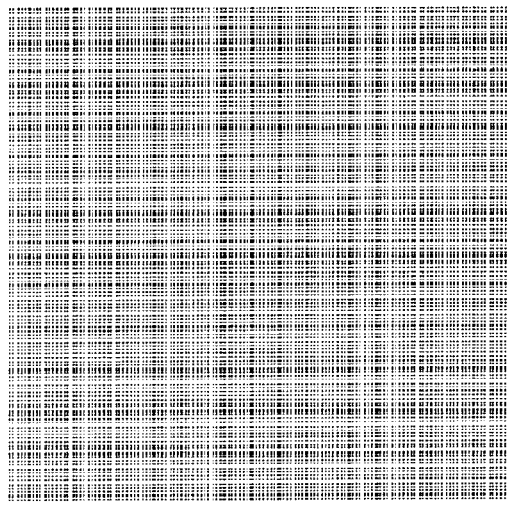
FIG. 2A is a view showing a partial raw image.
Figure 2B:
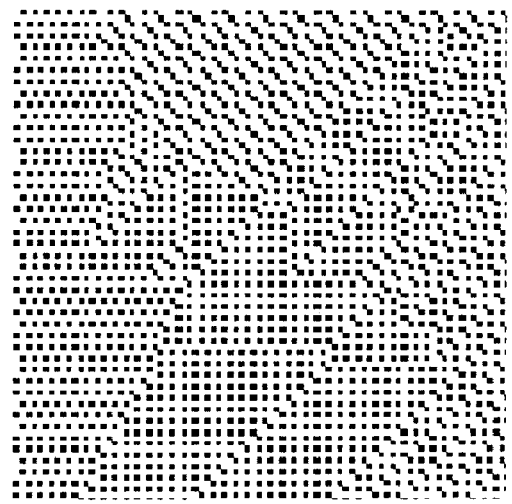
FIG. 2B is a view showing a partial image which is obtained by using the prior art to the partial raw image in FIG. 2A.

Here, if the signal bit width of the feedback loop is limited to the 10 bits and the noise signal source 16 (and the adder 14) is not used, the particular pattern appears in the output image shown in FIG. 2B, as mentioned above. In FIG. 2B, for the easy understanding, the pixel of 0/255 is printed as black, and the pixel of 1/255 is printed as white.

However, in the error diffusion processing circuit of the present invention, the noise signal source 16 is prepared for generating the noise signal to add to the quantized error signal. The noise signal source 16 generates alternately 1 and 0. Strictly speaking, the noise signal source 16 is prepared such that 1 and 0 are inverted even in a horizontal pixel direction and even in a vertical pixel direction. Consequently, the result after the adding the noise signal to the higher third bit of the quantized error signal in the feedback loop is shown in FIG. 4B. As show in FIG. 4B, it is known that without any occurrence of the particular pattern shown in FIG. 2B, the pixel of 0/255 and the pixel of 1/255 are dispersed at random in which the error is diffused.

Figure 5:
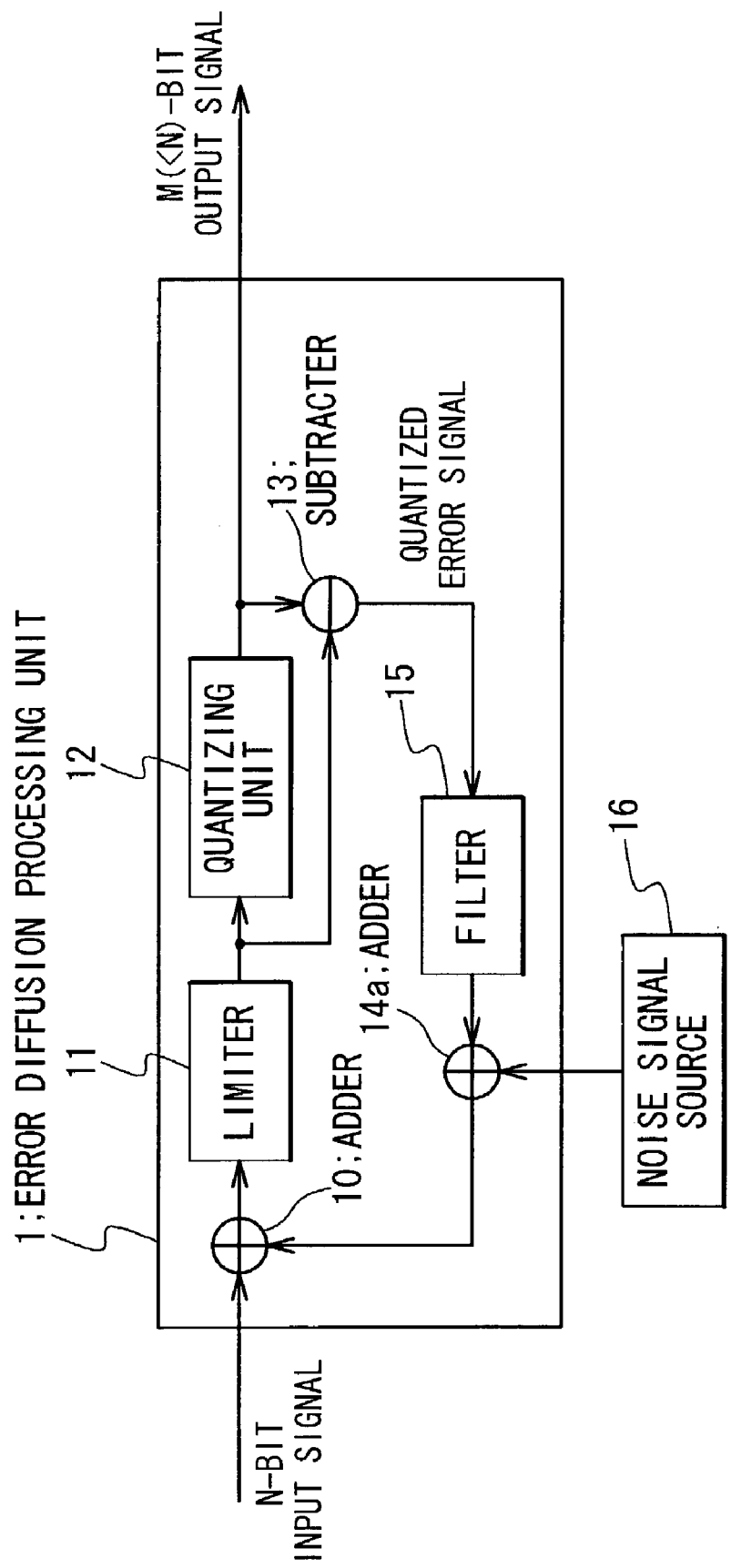
FIG. 5 is a block diagram of an error diffusion processing circuit of a second embodiment of the present invention.

As another embodiment of the present invention, the position to which the noise signal is added may be after the filter unit 15, shown in FIG. 5. In FIG. 5, the noise signal from the noise signal source 16 is added by an adder 14a inserted after the filter unit 15.

Figure 6:
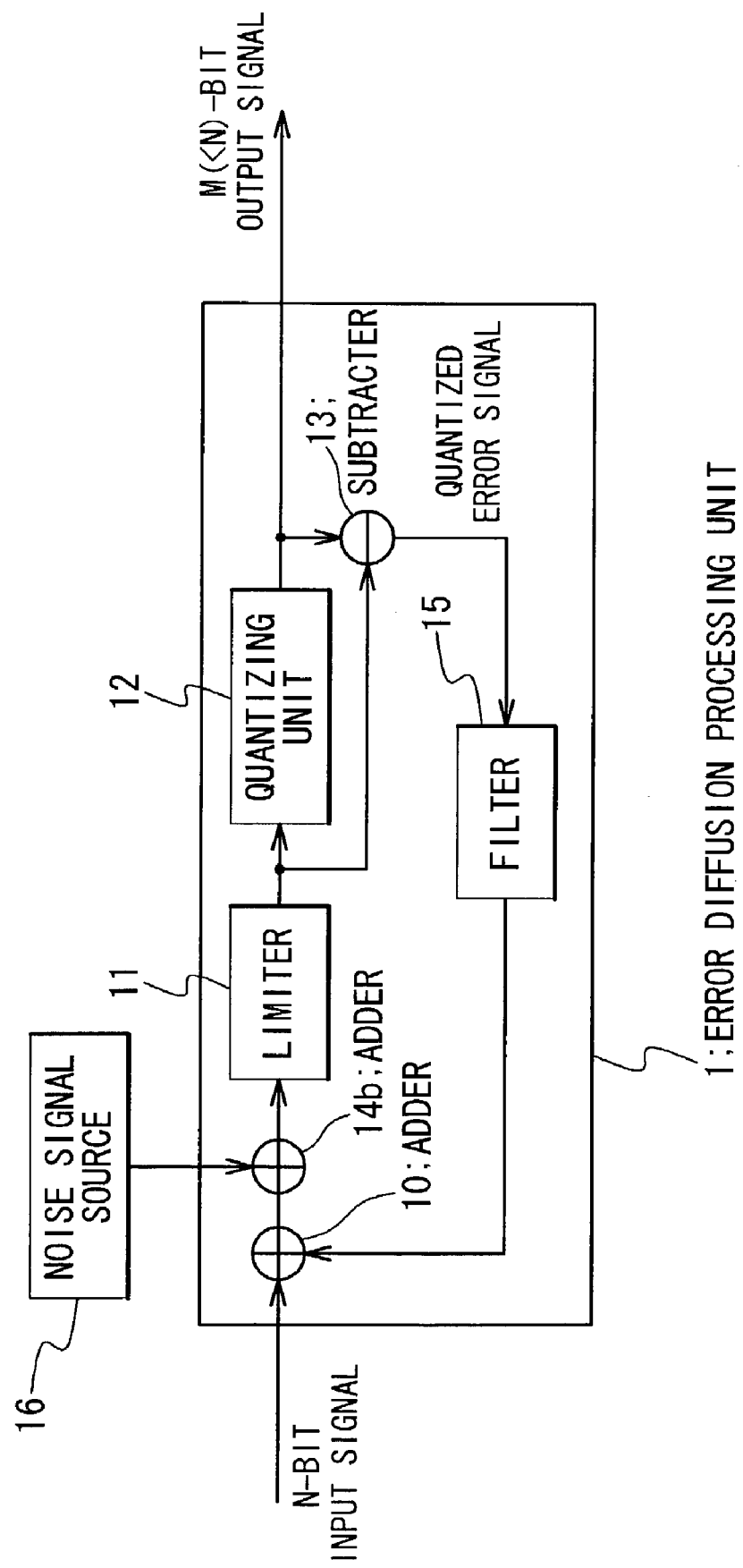
FIG. 6 is a block diagram of an error diffusion processing circuit of a third embodiment of the present invention.

As still another embodiment of the present invention, the position may be before the limiter 11, shown in FIG. 6. In FIG. 6, the noise signal from the noise signal source 16 is added by an adder 14b that is inserted after the adder 10 and before the limiter 11.

Figure 7:
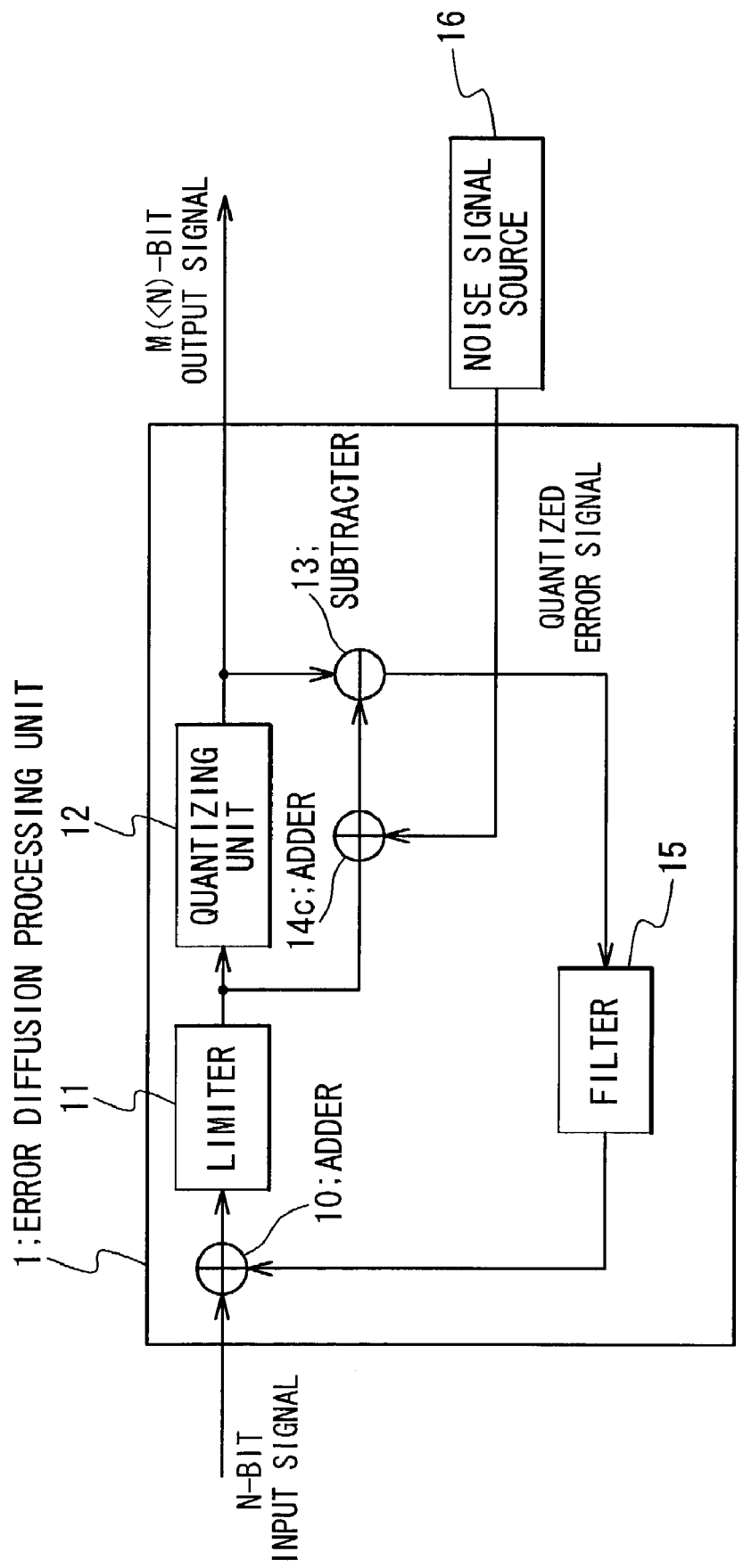
FIG. 7 is a block diagram of an error diffusion processing circuit of a fourth embodiment of the present invention.
Figure 8:
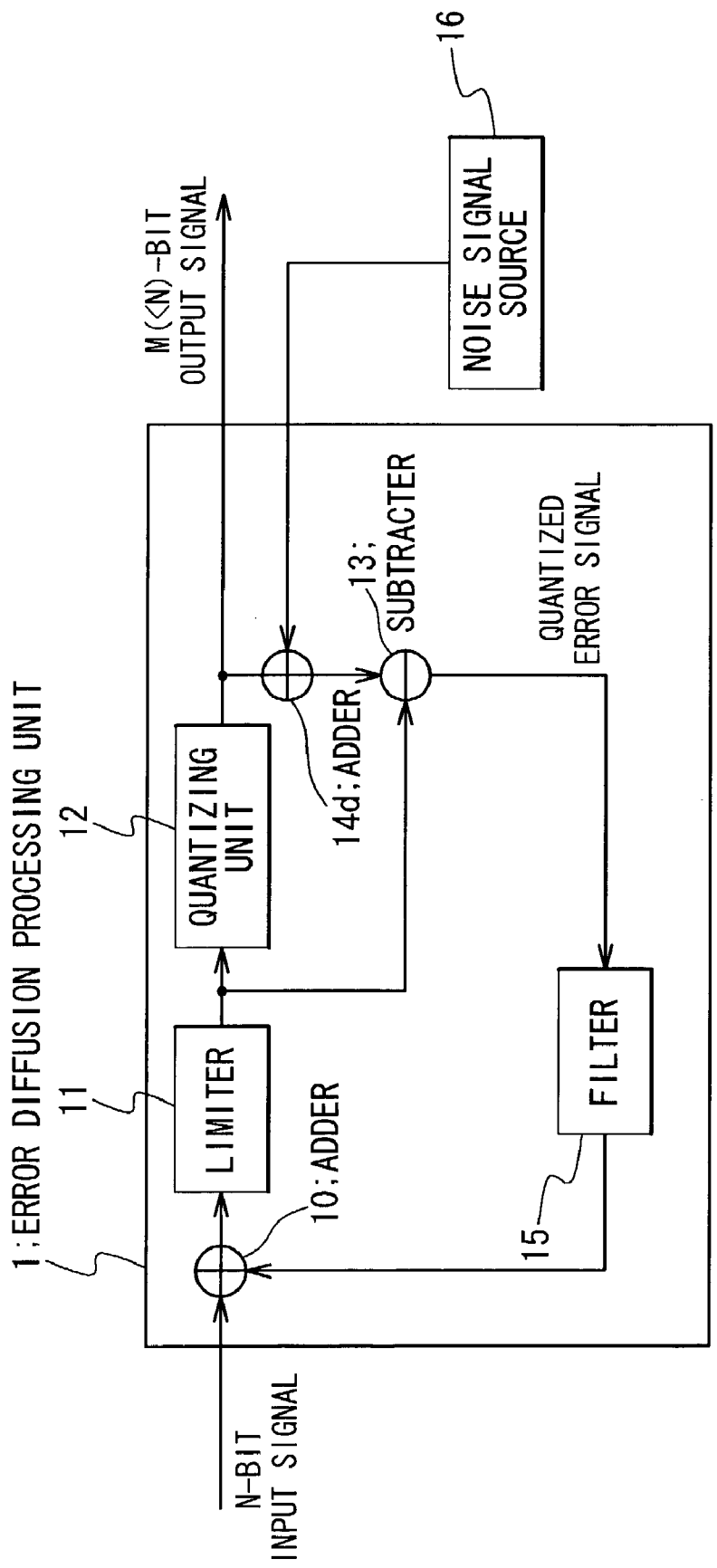
FIG. 8 is a block diagram of an error diffusion processing circuit of a fifth embodiment of the present invention.

As yet still another embodiment of the present invention, the position may be before the subtracter 13, shown in FIGS. 7 and 8. In FIG. 7, the noise signal from the noise signal source 16 is added by an adder 14c that is inserted after the limiter 11 and before the subtracter 13. In FIG. 8, the noise signal from the noise signal source 16 is added by an adder 14d that is inserted after the quantizing unit 12 and before the subtracter 13.

As mentioned above, according to the present invention, this provides the effect of obtaining the output in which the error is diffused into the pixels at random without any occurrence of the particular pattern in the output image. It is because the noise signal source is prepared to add the quantized error signal within the feedback loop, even if the signal bit width of the feedback loop is limited.

As the noise source to be added, if the an average of values indicated in the noise signals in a certain range is constant, many random number generators satisfy this property without any influence on the image quality. For example, even the random number generated by the residue method or even the signal generated by the M-sequence generator has such property. Thus, the effect of the present invention can be obtained without any influence on the image quality. Also, the dither pattern generator for alternately generating 1 and 0 can attain the effect of the present invention.

Also, in the configuration of the present invention, it is not necessary that the added noise signal is based on the sine wave. If the local average value of the noise signals is substantially constant, any signal source may be used. It is possible to use the steady signal such as the M-sequence signal, the dither pattern signal and the like. It is not necessary to adaptively change the signal based on the average value between the peripheral pixels. Thus, this provides the effect that the circuit can be configured very easily and cheaply.

What is claimed is:

1. An error diffusion processing circuit for carrying out error diffusion processing of input image signals of pixels comprising:
    a quantizing unit which quantizes an input image signal of each pixel to generate an output image signal having a number of gray tones smaller than that of said input image signal;
    a subtracter which generates an error signal based on a difference between said input image signal and said output image signal;
    a filtering unit which generates a plurality of filtered error signals from said error signal, said plurality of filtered error signals including a feedback error signal to be spatially diffused into a neighboring pixel next to each pixel;
    a first adder which adds, to said feedback error signal, an input image signal of said neighboring pixel to be input into said quantizing unit;
    a noise signal source which generates a noise signal; and
    a second adder which adds said noise signal to any one of: said input image signal, said output image signal, said error signal, and said feedback error signal,
    wherein said noise signal is fed in a feedback loop including said quantizing unit, said subtracter, said filtering unit and said first adder.

2. The error diffusion processing circuit according to claim 1, wherein said noise signal is random and has an average that is constant in a certain range of an image.

3. The error diffusion processing circuit according to claim 1, wherein said second adder is provided between said quantizing unit and said subtracter and adds said noise signal to said output image signal.

4. The error diffusion processing circuit according to claim 1, wherein said second adder is provided between said subtracter and said filtering unit and adds said noise signal to said error signal.

5. The error diffusion processing circuit according to claim 1, wherein said second adder is provided between said filtering unit and said first adder and adds said noise signal to said feedback error signal.

6. The error diffusion processing circuit according to claim 1, wherein said second adder is provided between said first adder and said quantizing unit and adds said noise signal to said input image signal to be input into said quantizing unit.

7. The error diffusion processing circuit according to claim 1, wherein said second adder is provided between said first adder and said subtracter and adds said noise signal to said input image signal to be input into said subtracter.

8. The error diffusion processing circuit according to claim 2, wherein said certain range is less than a half of a line in a frame.

9. The error diffusion processing circuit according to claim 2, wherein said noise signal is generated based on M-sequence (Maximal linear recurrence sequence).

10. The error diffusion processing circuit according to claim 2, wherein said noise signal is generated based on a dither pattern composed of 1 and 0.

11. The error diffusion processing circuit according to claim 1, wherein said noise signal is a alternate signal composed of 1 and 0.

12. The error diffusion processing circuit according to claim 1, further comprising:
    a limiter which limits a level of said input image signal to be input into said quantizing unit.

13. The error diffusion processing circuit according to claim 10, wherein said noise signal unit comprises:
    a pixel position counter which outputs a pixel position;
    a line number counter which outputs a line number; and
    an exclusive-OR circuit which carries out an exclusive-OR operation between said pixel position and said line number to generate said dither pattern.

14. An error diffusion method of carrying out error diffusion processing of input image signals of pixels, comprising the steps of:
- (a) quantizing input image signal of each pixel to generate an output image signal having a number of gray tones smaller than that of said input image signal;
- (b) generating an error signal based on a difference between said input image signal and said output image signal;
- (c) generating a plurality of filtered error signals from said error signal, said plurality of filtered error signals including a feedback error signal to be spatially diffused into a neighboring pixel next to each pixel;
- (d) adding to said feedback error signal, an input image signal of said neighboring pixel to be processed in said step (a); and
- (e) adding a noise signal to any one of: said input image signal, said output image signal, said error signal, and said feedback error signal 15. The error diffusion processing method according to claim 14, wherein said noise signal is random and has an average that is constant in a certain range of an image.

16. The error diffusion processing method according to claim 15 wherein said certain range is less than a half of a line in a frame.

17. The error diffusion processing method according to claim 15 wherein said noise signal is generated based on M-sequence (Maximal linear recurrence sequence).

18. The error diffusion processing method according to claim 15 wherein said noise signal is generated based on a dither pattern composed of 1 and 0.

19. The error diffusion processing method according to claim 14 wherein said noise signal is a alternate signal composed of 1 and 0.

20. The error diffusion processing method according to claim 14, further comprising the step of:
- (f) limiting a level of said input image signal to be processed in said step (a).

* * * * *